Figure 1:
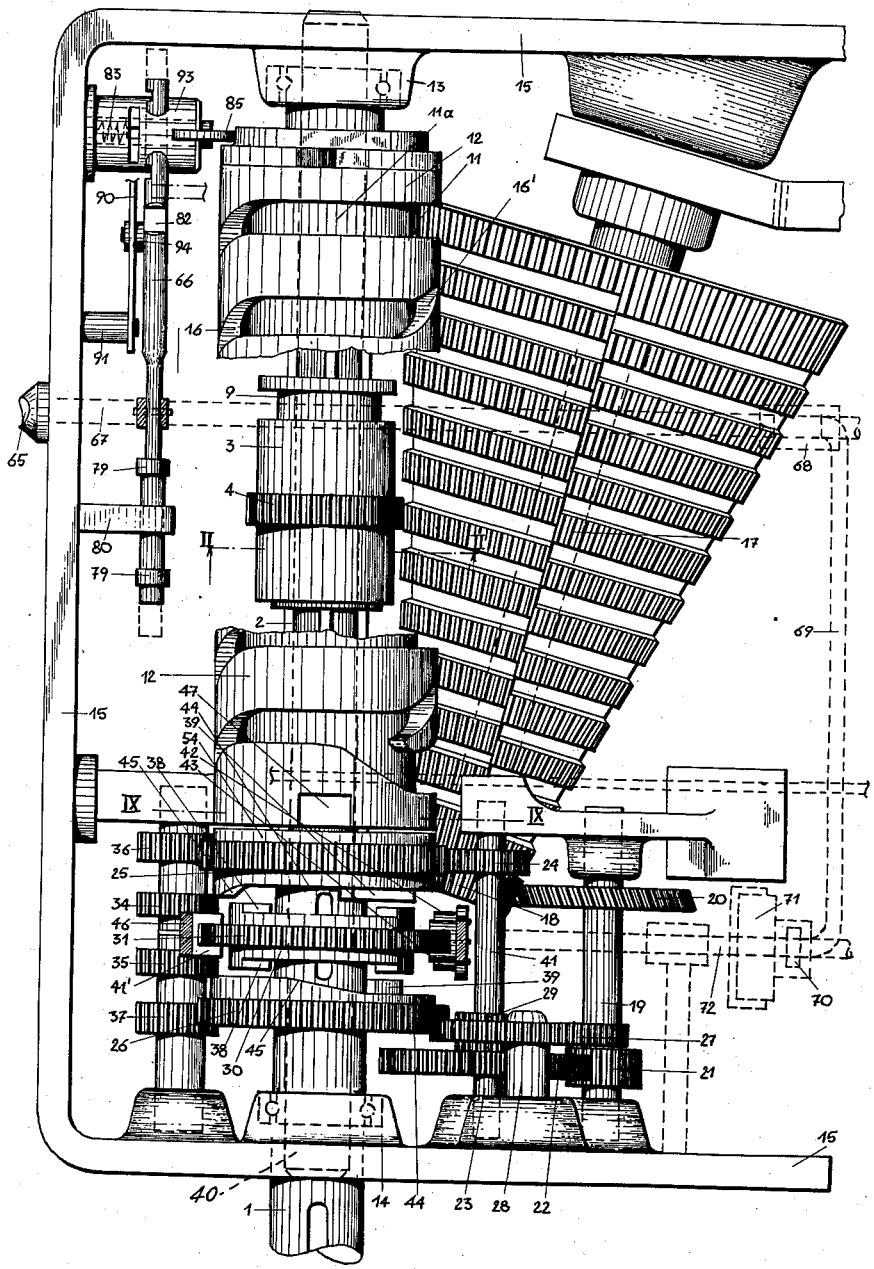

INVENTOR.
Karl Schäfer
BY

March 1, 1960  K. SCHÄFER  2,926,538
CHANGE SPEED GEARS
Filed Dec. 27, 1955  5 Sheets-Sheet 2
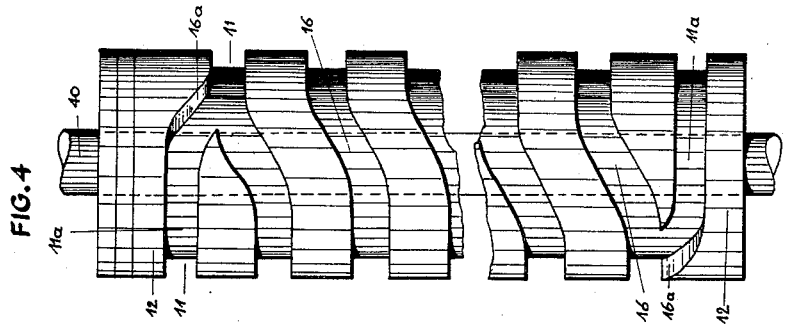
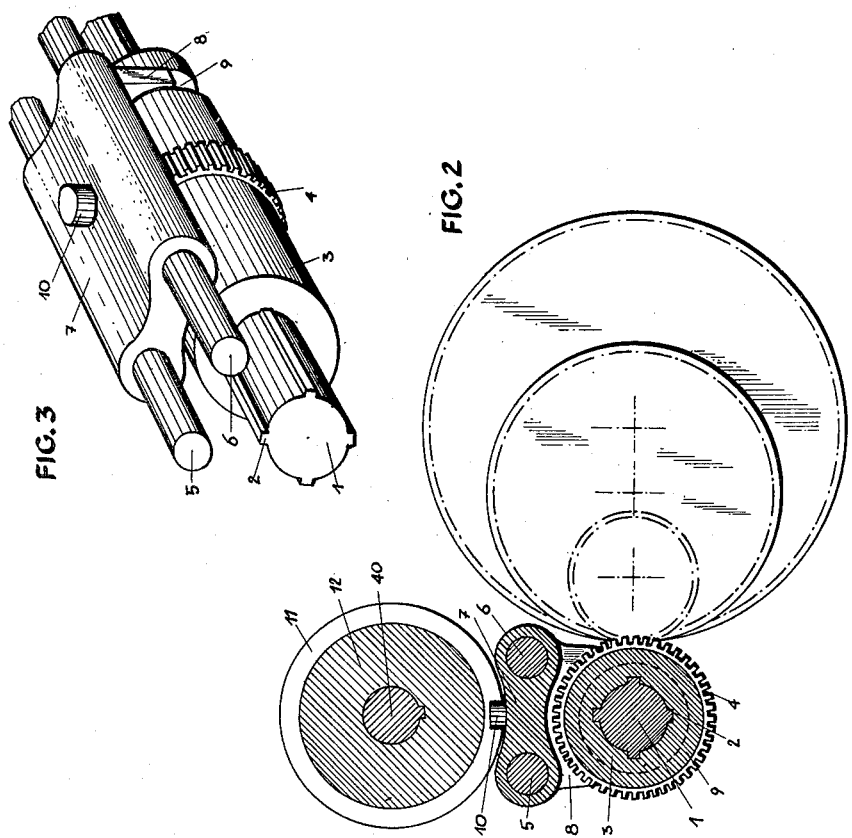
INVENTOR.
Karl Schäfer
BY

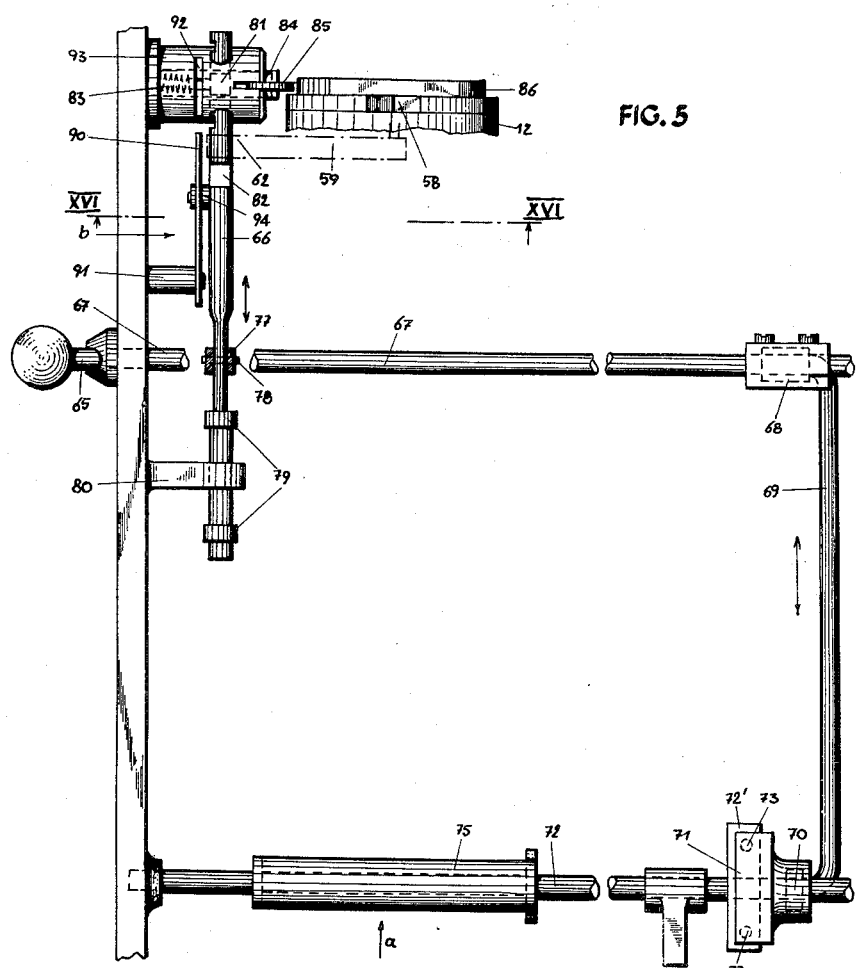

March 1, 1960
K. SCHÄFER
2,926,538
CHANGE SPEED GEARS
Filed Dec. 27. 1955
5 Sheets-Sheet 4
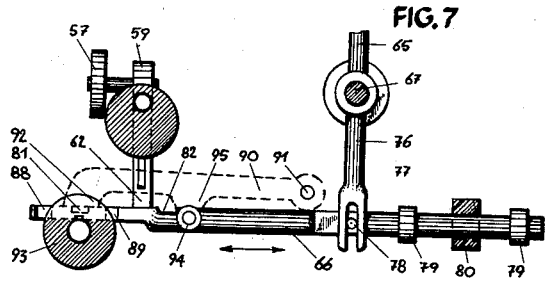
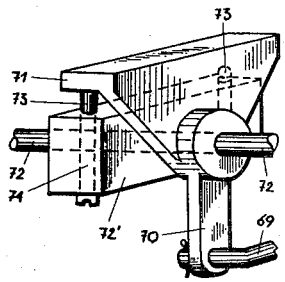
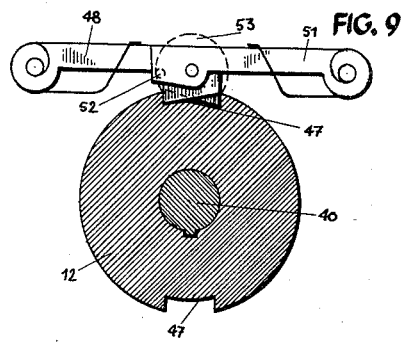
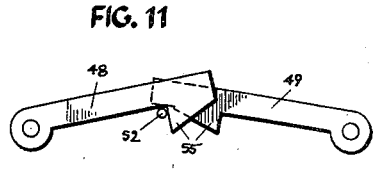
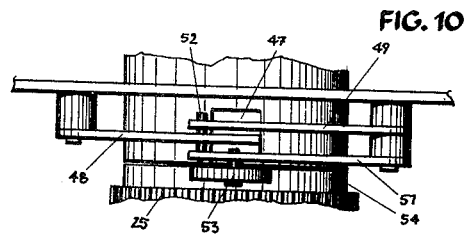
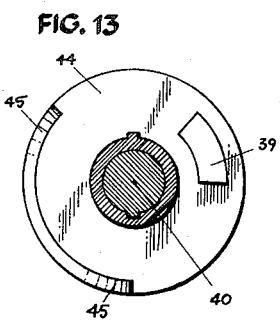
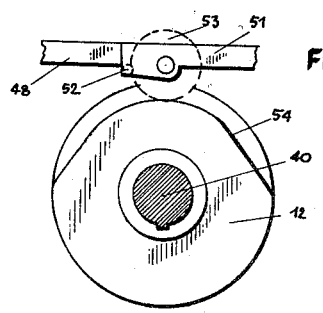
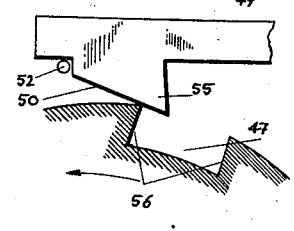
INVENTOR.
Karl Schäfer
BY March 1, 1960 K. SCHÄFER 2,926,538
CHANGE SPEED GEARS
Filed Dec. 27, 1955 5 Sheets-Sheet 5
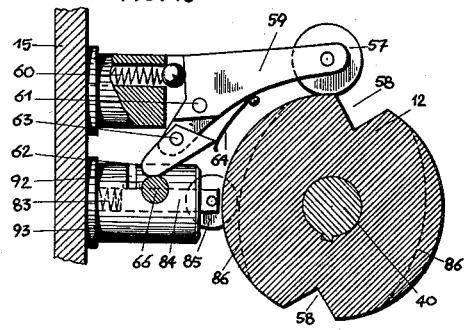
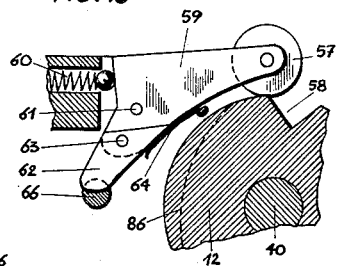
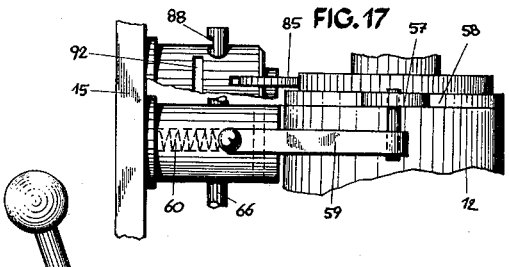
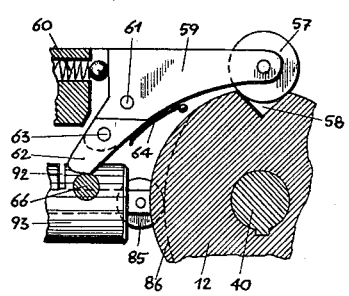
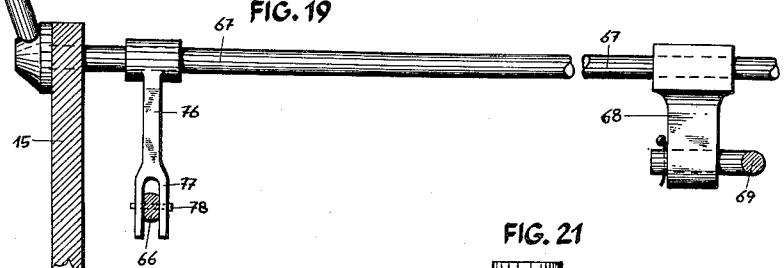
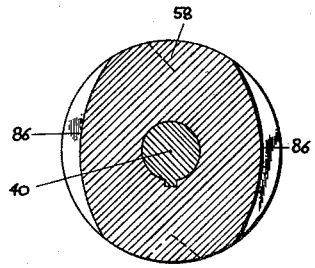
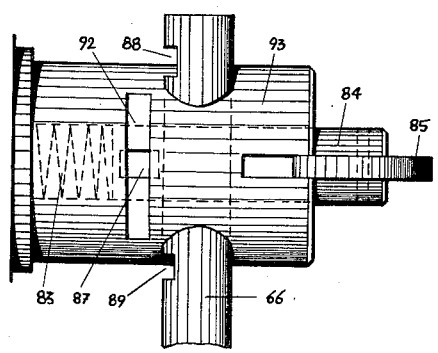
INVENTOR.
Karl Schäfer
BY
ATTORNEY

2,926,538
CHANGE SPEED GEARS
Karl Schäfer, Ohorn, Germany

Application December 27, 1955, Serial No. 555,698

11 Claims. (Cl. 74—351)

This invention relates to a change speed gear comprising a plurality of stepped gears arranged on a cone.

In a known gear of this type having a conical series of stepped bevel gears the latter are firmly arranged side by side on a cone, and the operating motions of a control gear displaceably disposed along a line of the surface of the cone of stepped gears on the driving shaft are determined by a control shaft and upon change of step the control gear is in mesh with a tooth of one step and simultaneously with a tooth of the next step.

This kind of change speed gear has operated well in numerous applications, but it is not quite satisfactory when great forces and high speeds are concerned, since in this case, due to particular constructional details, the risk of breakage is involved.

The present invention obviates this disadvantage by providing an arrangement in which a control gear longitudinally displaceable along a surface line of the cone on the driving shaft is controlled by roll engaging grooves of a grooved roller rotated 180° at each operation by a gear coupled with the drive to bring the roll from a non-rising portion of the groove concerned into a portion thereof ascending or descending towards the next groove.

Without great frictional resistance the control gear having the form of a pinion is thus controlled by the engagement of the roll connected with it with rotating uninterrupted grooves which effect the necessary stoppage as well as the forward and reverse motions of the pinion after a rotation of the grooved roller of 180°. At the last groove means are provided for returning the pinion to the preceding groove to avoid breakage by passing the end positions.

There are no parts which could be damaged by the adjustment of the pinion even if very great forces occur. The grooved roller can be conveniently driven forward or backward with the aid of a simple coupling sleeve and of two spur gears running in opposite directions on the shaft of the grooved roller and continuously rotated by the driven cone of stepped gears. The coupling sleeve displaceable but non-rotatable on the shaft is disposed between the spur gears the faces of which are provided with means for returning the sleeve to neutral position after the grooved roller shaft has been turned 180°. On each flank of the continuously rotating gears disposed opposite the coupling sleeve a cam is provided which automatically causes disengagement of the clutch when the grooved roller has been rotated 180°.

In order to prevent further rotation of the grooved roller due to inertia after the disengagement of the clutch two diametrically opposed notches are provided at one end of the grooved roller for engagement with a spring pawl movable on the circumference of the roller and after half a revolution thereof dropping into one of the notches. The other end of the grooved roller is provided with a disc having two diametrically opposed notches which after half a revolution of the roller are engaged by two spring-actuated pawls lifted at the proper moment to permit again rotation of the roller.

By means of a control lever the gear can be set to left-hand and right-hand rotation of the grooved roller in such a way that wrong adjustment of the lever will not cause any breakage in the gear. This is brought about by limiting the free movement of the control lever by means of two oppositely disposed stops which control the means for displacing the coupling sleeve and which are spring-controlled to permit turning of the lever even if the stop support is prevented from moving.

When high speeds are transmitted there is no gentle driving, but an impact is given which causes unwanted rotation of the pinion to the right or left and thereby premature displacement of the driving gear on the driving shaft, so that the gear is not properly positioned relative to the teeth of the stepped gear cone and simultaneously faces two toothings, which may lead to breakage.

According to the invention, this serious drawback is overcome by providing the coupling sleeve on the shaft of the grooved roller with a toothed rim possessing two diametrically opposite gaps. At displacement of the sleeve a spur gear forming part of a gearing comprising four gears driven by continually rotating spur gears engages one of the gaps, so that the sleeve is rotated also and with it the shaft on which it is non-rotatably disposed.

To fix the shaft of the grooved roller in position after completion of an operation two spring pawls, one for right-hand and one for left-hand rotation of the grooved roller, cooperate with an approximately rectangular notch provided on the roller. The pawls lie with obliquely extending edges on the circumference of the roller and enter the notch with their tips until the latter strike an edge of the notch when the entire pawl enters, and the shaft of the roller is fixed. A cam connected with the continually rotating gear of the coupling lifts the pawls out of the notch and releases them after further rotation of the shaft. During the time when the pawls are out of engagement with the shaft of the grooved roller the latter is prevented from turning by an additional spring pawl cooperating with two oppositely arranged notches on the shaft to hold the roller. This arrangement suffices to prevent unintentional rotation of the shaft if the gear of the coupling member should stick.

Premature movement of the hand lever effecting adjustment of the coupling member displaceable by the grooved roller shaft and liable to cause an interruption of the operating motion and fix the control pinion in wrong position is prevented by providing a bar moved to and fro by the hand lever with two notches which according to right-hand or left-hand rotation of the shaft of the grooved roller are engaged by a pawl controlled by the shaft after the lever has completed its movement and is locked. As an incomplete motion of the hand lever may place the coupling member in a position at which coupling and shifting are started, the pawl would be unable to drop. The positively controlled pawl would, however, still be moved and meet the resistance of the bar without finding the notch, which would lead to breakage. This is prevented by providing the part of the pawl cooperating with the notch with a spring which presses it into operating position so that the end of the pawl can give way.

The invention is illustrated by way of example in the accompanying drawings, wherein Figure 1 is a top view of the change speed gear without control rods;

Fig. 2, a vertical section thereof on the line II—II of Fig. 1;

Fig. 3, a diagrammatic view of the driving pinion with bearing;

Fig. 4, a view of the grooved roller;

Fig. 5, a top view of the change speed gear showing the control rods without most of the other parts;

Fig. 6, a view in the direction of the arrow *a* in Fig. 5;

Fig. 6a, a view of a detail;

Fig. 7, a front view seen in the direction of the arrow *b* of Fig. 5;

Fig. 8, a view of the spring arrangement influencing the hand lever; and

Figs. 9 to 21 are views of details referred to in the description.

On the horizontal driving shaft 1 (Figs. 1 to 3) provided with guide ribs or splines 2 a slide cylinder 3 is located which carries a longitudinally displaceable pinion 4. Above the driving shaft 1 two round rails 5, 6 (Fig. 3) are arranged parallel thereto. On these rails moves a slide 7 which with forks 8 (Figs. 2, 3) which extend downwardly into an annular groove 9 of the slide 3 supporting a rotatable upwardly projecting roll 10 adapted to engage one of the grooves 11 of a roller 12 (Fig. 4). The roller 12 with its shaft 40 extends parallel to the driving shaft 1, which is supported in the walls of casing 15, while shaft 40 is rotatably mounted in bearings 13, 14.

The slide 7 (Fig. 3) is secured in its position of rest by the engagement of the roll 10 with a non-rising portion 11a (Figs. 1, 4) of the groove 11 concerned. Each groove 11 has two diametrically opposed ascending portions 16 (Figs. 1, 4) whereby successive grooves pass into one another, so that at each rotation of the roller 12 the roll 10 twice engages a non-rising portion 11a of a groove and the slide 7 stands still. When, however, due to rotation of roller 12 the roll 10 enters an ascending portion 16, the slide 7 will be correspondingly displaced. The rise of the curve is so dimensioned that an accurately measured motion is imparted to the pinion 4 to guide it from one stepped gear of the cone to the next without coming out of engagement with the toothings.

The shaft of the stepped gear cone is therefore driven from the pinion 4. Fig. 2 shows in dot and dash lines the largest and the smallest diameter of the cone of stepped gears and also the diameter of the gear part in engagement with pinion 4. At the end of the shaft 17 (Fig. 1) of the cone of stepped gears a toothed wheel 18 is in continuous engagement with a toothed wheel 20 on shaft 19 provided also with a spur gear 21 in mesh with a spur gear 22 on shaft 23. This shaft supports also a spur gear 24 which is in continuous engagement with a large spur gear 25 rotatably arranged on the shaft of roller 12 which supports also a second rotatable toothed wheel 26 engaging an intermediate gear 27 rotatable on the frame bolt 28. Intermediate gear 27 meshes with a spur gear 29 on the shaft 23 carrying the spur gear 24.

The coupling sleeve 30 has a toothed rim 31 possessing two diametrically opposite gaps 32, 33 (Fig. 6). Upon displacing the sleeve 30, in one or the other direction a spur gear 34 or 35 (Figs. 1, 6) enters one of the gaps. The spur gears 34, 35 form part of a gearing mechanism comprising the spur gears 34, 36 and 35, 37. The gearing mechanism 34, 36 being turned by the continuously rotating spur gear 25 and the gearing mechanism 35, 37 by the spur gear 26, so that the toothed rim 31 is rotated in the same direction. As the sleeve 30 is displaceable but non-rotatable on the shaft of the grooved roller 12, the latter is rotated also.

The coupling sleeve 30 is fitted on each flank with two noses 38 (Fig. 1), and on each flank of the spur gears 25, 26 facing the sleeve a catch 39 is provided. When this catch 39 engages one of the noses 38 by the displacement of the sleeve 30, then the coupling sleeve is taken along through the corresponding gear 25 or 26, whereby on the one hand rotation of the shaft 40 of the roller 12 to the right or left is effected.

On the other hand, one of the gearing mechanisms 34, 36 or 35, 37, is thereby engaged with the toothed rim 31 of the coupling sleeve 30, because at the very moment in which the coupling sleeve 30 is taken along by one of the noses 38, the gearing mechanism 34, 36 or 35, 37 will be in one of the gaps 32, 33 (Fig. 6). This tooth engagement prevents an advance of the coupling sleeve 30. Since the coupling sleeve 30 is axially movable on the axis of the control grooved roller 12, but cannot be rotated thereon, the control roller cannot for a single moment run uncontrolled.

The arm 41 (Fig. 6a) supports two rolls 42, 43 which during engagement of the stops 38 of the coupling sleeve 30 with a counter-stop of the spur gear 25 or 26 lie against the side 44 of one or the other of these gears. As soon, however, as the rising curve 45 of the side 44 comes within range of the rolls 42 or 43, the arm 41 together with the arm 46 is moved into neutral position to return the coupling sleeve 30. This operation always occurs after the shaft 40 has carried out half a revolution during which the roll 10 moves from a non-rising portion of a groove 11 to a rising portion 16 to displace pinion 4 and then passes again into a non-rising portion 11a. After pinion 4 has finally reached the largest or smallest stepped gear, its displacement beyond the end position is no longer possible.

When owing to wrong adjustment of the hand lever 65 the coupling is actuated in such a way that the pinion slide 3 is displaced towards the end and the roll 10 is in the last groove and cannot be displaced any more, breakage is prevented as follows:

To the last groove 11 (Fig. 4) a part 16a is connected to return the roll 10 on reaching this part to the preceding groove and also the pinion 4. Whenever the pinion is placed in the last step and the hand lever 65 is wrongly handled, this operation is repeated and no breakage can occur.

The grooved roller 12 (Figs. 4, 9) is shown in vertical section on line IX—IX in Fig. 1, and the parts omitted in Fig. 1 can be seen in Fig. 10 and Figs. 11, 12, 13, 14 and 15. Roller 12 possesses two diametrically opposed notches 47 associated with two spring pawls 48, 49 each of which has a sloping edge 50 (Fig. 15). The pawls are lifted and kept out of contact with the surface of the roller 12 by a control lever 51 (Fig. 12) which for this purpose is provided with a vertical pin 52 (Figs. 11, 12) engaging below the pawls 48, 49.

On its free end the lever 51 supports a roll 53 moving on a cam disc 54 (Figs. 10, 14) arranged on the flank of the spur gear 25 (Figs. 1, 14) and lifting the pawls 48, 49 into the position shown in Fig. 11 before they are subsequently placed on the circumference of roller 12 by a corresponding motion of the control lever 51. When the roller 12 rotates for instance counter-clockwise, the spring pawl 49 (Fig. 15) sliding on the surface of the roller comes to the end of the slope 50 with its tip 55 within range of the approximately rectangular notch 47 whose side walls are slightly undercut.

During further rotation of the roller 12 the pawl moves farther into the notch 47 until its tip 55 strikes against wall 56, whereupon the pawl fully engages the notch and locks the roller 12. The same operation takes place with respect to pawl 48 when the roller 12 moves in opposite direction. One pawl always drops automatically into a notch when the other pawl is in locking position.

The roll 57 (Figs. 16 to 18a) cooperating with the notches 58 and additionally securing the roller 12 is disposed at the end of lever 59 controlled by a spring 60. Beyond its fulcrum 61 the lever has an extension 62 articulated to it by bolts 63 and continually kept in extended position by a spring 64 (Fig. 18). With its end 62 the lever 59 lies on a bar 66 movable by a hand lever 65 arranged on a bar 67 (Figs. 5, 19) to which a lever 68 is secured having a cross rod 69 articulated to its end and engaging a lever 70 (Fig. 8). When the lever 68 is moved in one or the other direction, the lever 70 cooperates in the movement. This lever is firmly connected to the part 71 and rotatable on the shaft 72 while part 72' is firmly connected therewith and fitted with inserted pins 73. At the motion of part or yoke 71 the pins 73 engage springs 74 inserted in bores of part 72', which on being tensioned tend to return part 71 to its old position (Figs. 5, 6, 8).

The shaft 72 is provided with a stirrup 75 supporting the arms 41, 46 each of which has a sliding member 41' between which the toothed rim 31 of the coupling sleeve 30 is held (Fig. 6). The arm 41 supports a pair of rolls 42, 43, as mentioned. To the bar 67 (Fig. 19) a lever 76 is secured which at rotation of the bar 67 is taken along to the right or left. The forked end 77 of the lever embraces the rail 66 provided with lateral pins 78 projecting into longitudinal slots of the forked end 77 of lever 76, so that at turning of lever 76 the rail 66 is moved in one or the other direction, the extent of the turning motion being limited by the stops 79 (Fig. 5) cooperating with the frame member 80.

In order to secure the rail 66 (Fig. 5) in its two end positions two notches 81, 82 (Figs. 5, 7) are provided thereon which are engaged by the end 62 of the lever 59, shown in Figs. 16, 17, 18, at the commencement of a shifting operation, since lever 59 swings out only when the roller 12 begins to rotate. The lever then tends to press the end 62 down upon the bar 66, and if none of the notches 81, 82 is available, the end 62 is held in the position shown in Fig. 16. When the end 62 arrives at one of the notches, the spring 64 insures its engagement with one of them, provided shifting has been initiated already. If the bar 66 has been brought to one of its end positions before this operation, lever 59 remains in the position shown in Fig. 18a, because in this case the roll 57 has engaged one of the notches 58 and lever 59 lies with its end 62 above the round bar 66. At the beginning of shifting lever 59 can drop unchecked into one of the notches 81, 82 and prevent pushing back of the bar 66 until the operation is completed.

Should the shifting motion have been initiated by insufficient turning of the hand lever 65 and a corresponding displacement of the bar 66 occur, the end 62 of lever 59 would break if it were rigidly secured to the lever. Owing to the flexible arrangement of the lever, breakage is avoided.

As indicated in Figs. 16, 17, 18a, 20 and particularly in Fig. 21, a ram 84 controlled by a spring 83 supports a roll 85 kept out of engagement with a double cam disc 86 by a nose 87 of the ram (Fig. 21), which bears against the bar 66. Only at displacement of the bar 66 when the nose 87 enters one of the recesses 88, 89 provided thereon can the ram be displaced by the action of the spring 83 to effect engagement of the double cam disc 86 with the roll 85 to prevent displacement of the bar 66 to the right or left. When the roller 12 is rotated again, the roll 85 is moved back, and while the nose 87 is urged out of the recess 88 or 89 the roll 57 supported by the lever 59 leaves one of the notches 58 and the end 62 drops into one of the recesses 81, 82. Longitudinal displacement of the bar 66 is therefore prevented until the operation is completed. To hold the nose 87 brought out of one of the notches 88, 89 in this position to prevent unintentional shifting, a lever 90 movable about a bolt 91 (Figs. 1, 5, 7) drops into a slot 92 of a member 93 and places itself in front of the nose 87, so that the ram 84 cannot be moved in longitudinal direction towards the double cam disc 86. At longitudinal displacement of the bar 66 a roll 94 provided thereon engages a projection 95 of lever 90 to lift it and thereby release nose 87.

I claim:

1. A change speed gear comprising, in combination, a frame, a series of stepped gears arranged as a cone, a driving shaft, a control gear longitudinally displaceable on said shaft and along the stepped gears, a grooved roller, a second shaft, said grooved roller being rotatably mounted on said second shaft, said roller having a continuous groove along its periphery, said groove being formed of a series of alternate portions extending circumferentially around said roller in a radial plane and alternate portions extending spirally around said roller with each of the latter portions being intermediate and connected to each series of the first mentioned portions, a roll slidably mounted for sliding movement along the length of said roller and received in said groove, said roll being connected to said control gear, the longitudinal distance between adjacent ones of said first mentioned portions being chosen so as to move said control gear from one stepped gear to the next adjacent gear when said roller is rotated sufficiently to advance said roll from one of said first mentioned portions to the next adjacent of said first mentioned portions, means for rotating said roller comprising drive means engaged with said roller and connectable with said driving shaft for rotating said roller, means for engaging said drive means with said driving shaft to rotate said roller, the last named means including means operable to disengage said drive means from said driving shaft after each rotation of said roller sufficiently to move said roll from one of said first mentioned portions to the next adjacent one of said first mentioned portions.

2. The apparatus of claim 1 wherein said drive means comprises a gear rotatably mounted on said second shaft, a coupling sleeve non-rotatably connected to said roller, cam means connected to said gear, said coupling sleeve being movable into driving connection with said gear for driving said coupling sleeve and said connected roller from said gear, said sleeve being also movable out of driving connection with said gear, means connected to said coupling sleeve cooperable with said cam means when said sleeve is drivingly connected to said gear to move said sleeve out of driving connection with said gear when said roll has moved from one of said first mentioned portions to a next adjacent one of said first mentioned portions.

3. The combination of claim 2 wherein said sleeve is slidably mounted on said second shaft and faces said gear, a first projection on said gear projecting outwardly toward said sleeve, a pair of diametrically opposed projections on said sleeve spaced radially of said second shaft the same distance as said first projection and projecting outwardly towards said gear, said sleeve being slidable on said shaft to move the latter projections into the path of said first projection during rotation of said gear to drivingly connect said sleeve to said gear.

4. The combination of claim 2 including a second gear fixedly connected to said sleeve, said second gear having two diametrically opposed gaps, a third gear positioned for meshed engagement with said second gear when said sleeve is drivingly connected to the first mentioned gear, means drivingly connecting said second gear to said driving shaft, said second and third gears being designed such that one of the gaps in said second gear comes opposite the teeth on said third gear and said second and third gears become disengaged when said roll has moved from one of said first portions to an adjacent one of said first portions.

5. The combination of claim 1 including said roller having an end groove at each end respectively connected to the end of the adjacent groove and reentrant therein to return said roll to the latter adjacent groove when said roller is rotated to advance said roll endwise outwardly beyond either of said last adjacent grooves.

6. The combination of claim 1 including detent means for maintaining said roller in a selected rotation with said roll in a selected one of said first portions and said control gear in engagement with a selected one of said stepped gears, said detent means comprising a pair of pawls, means connected to said roller and having a slot therein, said pawls being movably mounted on said frame, said pawls being normally received in said slot, said slot having a first wall and an opposed second wall positioned in a plane perpendicular to the axis of rotation of said roller and extending generally radially of said axis, one of said pawls normally bearing against one of said walls and the other of said pawls normally bearing against the other of said walls to prevent rotation of said roller, means urging said pawls inwardly of said slot, means for moving said pawls out of engagement with said walls for rotation of said roller, said slot being rotatable when said roller rotates.

7. The apparatus of claim 6 wherein said means for moving said pawls out of engagement with said walls comprises a cam means operatively coupled to said driving shaft and a follower for said cam means connected to said pawls, said driving shaft being operable to move said cam means with respect to said follower to lift said pawls out of said slot.

8. Change speed gear according to claim 7, in which at elevated position of the two pawls an additional securing pawl fitted with a roll cooperating with two oppositively disposed notches of the grooved roller shaft holds the roller in the position determined by the two pawls.

9. The combination of claim 1 including said means for engaging said drive means with said second shaft comprises a shift lever, a bar connected to said lever, and slidably mounted on said frame, said bar having a pair of spaced notches, means forming a third notch connected to and rotatable with said roller, a pawl pivotally mounted on said frame, said pawl having a portion normally received in said third notch, when said roller is in a rest position with one of said stepped gears engaged with said control gear, one portion of said pawl comprising a separate member pivotally connected thereto and forming an extension of said pawl, means urging the latter portion to pivot on said pawl in a direction laterally of said bar, stop means on said pawl limiting the latter movement, a rod connected to said bar, said pawl being pivotally mounted on an axis parallel to the direction of movement of said bar and said latter portion being positioned at the surface of said rod when said pawl is in said third notch and said latter portion bears against said stop means, said bar being movable by said lever to bring one of the first mentioned notches beneath said latter portion when said lever is actuated to shift said control gear, said pawl being movable out of said third notch when said roller rotates to move said latter portion into said one of said notches when the latter is positioned opposite said latter portion of said pawl, said bar and said lever being maintained in operated position by said pawl when said pawl is in the latter notch, means urging pivotal movement of said pawl into said third notch during rotation of said means forming said third notch, said pawl being movable into said third notch when aligned therewith to release said bar and said lever, said third notch being aligned with said pawl whenever said control gear is in full engagement with one of said stepped gears.

10. The combination set forth in claim 9 including said bar having a pair of recesses spaced longitudinally along said bar, a ram member movable laterally of said bar, a cam follower connected to said ram member, a cam fixedly connected to said roller, means urging said cam follower towards said cam, said ram member being engageable in one of said recesses upon longitudinal movement of said bar when said hand lever is moved to operate said roller, said hand lever being movable in a forward and reverse direction to effect movement of said control gear along said stepped gear towards one end or the other of said cone with said lever and bar being movable such that one of said recesses on said bar comes opposite said ram in either extreme operational movement of said lever to effect movement of said control gear in one direction along said stepped gears, said means urging said cam follower into engagement with said cam also urging said ram into engagement with a recess positioned in the line of movement of said ram towards said cam and normally urging said roller against the exterior of said bar with said bar being slidable along said ram while said ram bears against said bar, said cam means being engageable with said cam follower during rotation of said roller and being formed to effect movement of said ram outwardly of the latter recess upon the completion of movement of said roller sufficiently to advance said control gear from one of said stepped gears to a next adjacent stepped gear.

11. The combination of claim 10 including a pawl movably mounted on said frame, said pawl being movable laterally of said ram, said ram having a projection, said pawl being movable into the line of movement of said projection to prevent movement of said ram into the latter recess under the influence of said means urging said ram towards said cam, cam means on said bar engageable with the latter pawl upon movement of said bar, the latter pawl being normally urged into engagement with said projection on said ram to intercept movement of said ram into one of said recesses, said ram projection being movable with said ram laterally across the latter pawl under influence, alternately, of said cam and said means urging said ram, said bar being operable to raise the latter pawl and release said ram for movement into a recess upon movement of said lever to shift said control gear.

References Cited in the file of this patent

UNITED STATES PATENTS

| 833,974 | Ruck | Oct. 23, 1906 |
| 2,208,148 | Schafer | July 16, 1940 |
| 2,273,404 | Healey | Feb. 17, 1942 |
| 2,526,117 | Carbonaro | Oct. 17, 1950 |

FOREIGN PATENTS

| 270,696 | Great Britain | Apr. 29, 1927 |